United States Patent Office

3,467,419
Patented Sept. 16, 1969

3,467,419
MEANS FOR SECURING A ROTOR ON A SHAFT
James H. Anderson, Spring Garden Township, and
Marinus J. Spruitenburg, York, Pa., assignors to
Borg-Warner Corporation, Chicago, Ill., a corporation of Illinois
Original application Apr. 8, 1963, Ser. No. 271,200, now
Patent No. 3,273,920, dated Sept. 20, 1966. Divided and
this application Aug. 23, 1966, Ser. No. 598,528
Int. Cl. F16d 1/06; F01d 1/00
U.S. Cl. 287—53                                    1 Claim

ABSTRACT OF THE DISCLOSURE

A hub member, for example the hub portion of a centrifugal compressor impeller, is secured to a drive shaft by means of a conical washer engaging a conical surface on the hub. The cone angles of the respecting engaging surfaces are not identical so that the periphery of the cone washer engages the hub before the radially innermost portions thereof.

---

Figure 1:
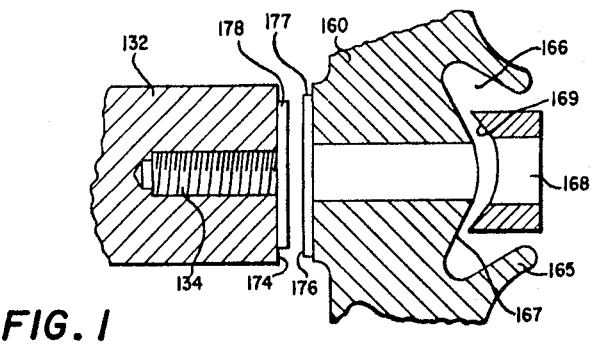

This is a division of application Ser. No. 271,200, filed Apr. 8, 1963, and now Patent No. 3,273,920.

Background and summary of the invention

This invention relates generally to centrifugal compressors and more particularly to improved means for mounting the compressor impeller on the drive shaft.

Because of the relatively high rotational speeds encountered, one of the major difficulties in constructing impeller type compressors has been the requirement that the tolerances of the various components, particularly of the gear train commonly employed between whatever prime mover is used and the impeller, be small. Otherwise, the resulting misalignment of components and unequal distribution of torque loads results in an early breakdown either partially or fully of the device. As is well known, the requirements that tolerances be kept quite small is extremely expensive from a practical viewpoint during the manufacturing process and consequently the cost to the user is much greater. Furthermore, aside from initial costs, the requirement that tolerances be held quite small limits the useful application of compressors since use in environments subject to wide ranges in temperature variation and wide ranges of external loads which might accidentally be placed on the device is precluded.

It is a principal object of this invention to provide a coupling betwen a shaft end and an impeller which insures that maximum torque be taken between those portions of the interface between the shaft end and the impeller which are the greatest radial distance from the axis of rotation.

Additional objects and advantages will be apparent from reading the following detailed description taken in conjunction with the drawing.

In the drawings:
FIGURE 1 is a cross-section, before final assembly, of a portion of the compressor impeller hub.

Detailed description of the invention

Referring now to the drawing, there is shown a conventional impeller 160 having a plurality of curved radially extending passageways providing channels for the inlet gas to flow toward the periphery of the impeller where it is delivered into an annular space or diffusion chamber. Since this type of centrifugal compressor is well known in the art, a more detailed description is believed to be unnecessary for a complete understanding of the invention.

The hub portion is provided with a cavity 166 located in the central portion of the impeller, one surface of the cavity 166 being provided with a convex conical portion 167 (note FIGURE 1). Spring washer 168, preferably formed of steel, is provided with a concave conical surface 169 closely approximating, but differing from, the cone of portion 167 before assembly of the elements. Before assembly, washer 168 is held lightly against the impeller, there being a slight space between conical portions 167 and 169 near the junction of these surfaces with the washer's aperture through which a bolt (not shown), adapted to be threaded into blind bore 134. As the radial distance increases, this space diminishes until finally, at the extreme outermost rim of washer 168, the space becomes zero, i.e., the washer rim contacts the conical portion 167. During assembly, the impeller hub portion, preferably formed of a relatively soft metal such as one of the well known aluminum alloys, suffers a deformation upon tightening of bolt 135 allowing the most extreme radial portions of the interfaces 174 and 176, between shaft 132 and impeller 160, respectively, to receive the greatest force from the clamping action. The aperture through washer 168 is appreciably larger than bolt permitting centering of the conical surfaces 167 and 169 independently of the bolt centering.

Interface 174 of the right portion of shaft 132 is provided with a complementary spiral 178 which mates with the depressions of spiral 177. By virtue of the above described difference in cone slope between conical portion 167 of impeller 160 and 169 of washer 168, the outermost portions of the mating spirals receive the greatest bolt clamping action and therefore take the greatest torque. The torque distribution at the interface, above described, has been found particularly desirable in precluding shear failures. In one instance, conical surfaces 167 and 169 were made identical before assembly and the bolt affixed with its customary clamping force to the end of shaft 132. Upon initiation of the compressor, because the outermost portions of the interface of 174 and 176 did not receive the greater part of the torque load (due to the deliberate mis-matching of conical portions 167 and 169 before assembly) it was found that spirals 177 and 178 sheared at those portions thereof which were quite near the washer aperture. It will be understood that other interface couplings may be employed in lieu of the spirals, as for example complementary radially extending depressions.

While this invention has been described in connection with a certain specific embodiment thereof, it is to be understood that this is by way of illustration and not by way of limitation; and the scope of this invention is defined solely by the appended claim which should be construed as broadly as the prior art will permit.

We claim:
1. The combination comprising a rotatable shaft; a hub element affixed against the end of said shaft to provide an interface therebetween and with said interface having axially intergaging hub and shaft portions thereon, said shaft having a longitudinal axis of rotation colinear with the axis of rotation of said hub element; fastening means for securing said hub element to said shaft, said means including a washer having a first generally conical surface formed thereon; means defining a second generally conical surface on said hub, the cone angles of said respective first and second conical surfaces being different, and the outer peripheral portion of said conical surfaces and said interface being in substantial axial alignment and formed so that the peripheral regions of said washer engage said hub prior to the regions closer to the axis of rotation, whereby upon assembly of the hub and shaft both of the surfaces of revolution undergo a slight deformation and those interengaging portions of said interface progressively further from the common axis of rotation take progressively greater shearing loads.

References Cited

UNITED STATES PATENTS 2,836,448   5/1958   King _____ 287—53

FOREIGN PATENTS 868,812   2/1953   Germany.
269,605   10/1950   Switzerland.

CARL W. TOMLIN, Primary Examiner

ANDREW V. KUNDRAT, Assistant Examiner

U.S. Cl. X.R.

253—39